Figure 3:
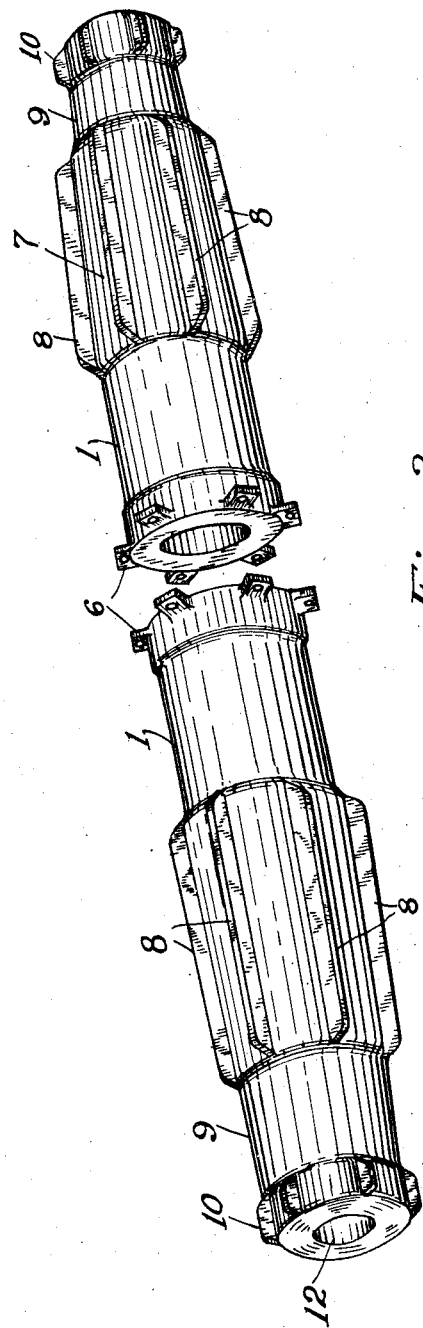

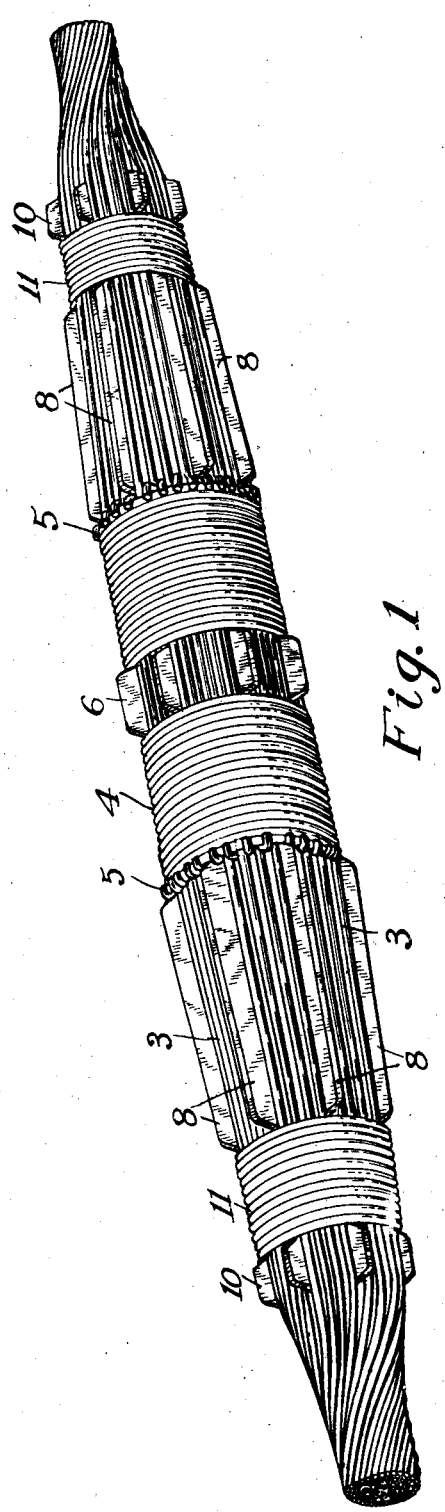
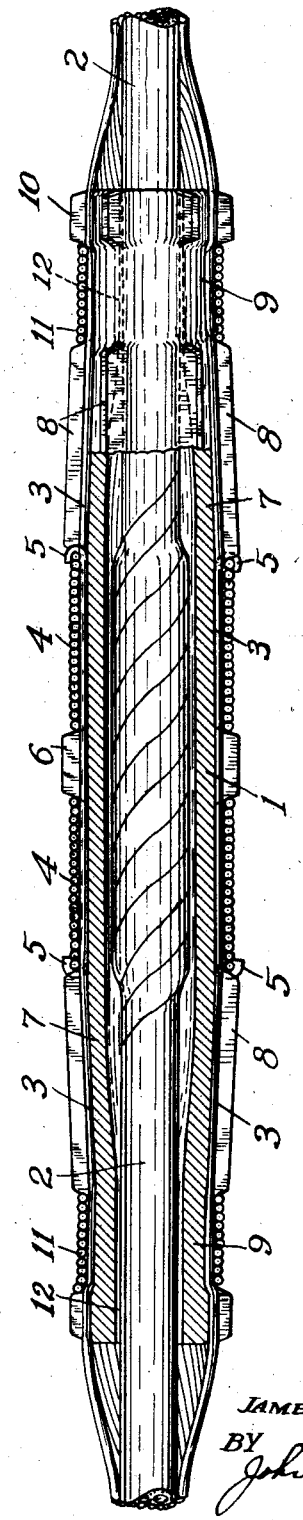

Oct. 28, 1947.  J. J. MORRISON  2,429,889
WIRE ARMORED CABLE SPLICE
Filed Oct. 21, 1944  2 Sheets-Sheet 2

INVENTOR
JAMES J. MORRISON
BY John E. Jackson
ATTORNEY

Patented Oct. 28, 1947

2,429,889

UNITED STATES PATENT OFFICE 2,429,889

WIRE-ARMORED CABLE SPLICE

James J. Morrison, Worcester, Mass., assignor to The American Steel and Wire Company of New Jersey, a corporation of New Jersey Application October 21, 1944, Serial No. 559,754

2 Claims. (Cl. 174—84)

This invention relates to wire-armored cable splices, the object being to provide a splice that is almost as light in weight as can be obtained when the cable armoring wires are directly interlocked with seizings without the use of a joint box, while at the same time providing a splice having a tensile strength approaching or equaling that of the cable and which frees the cable conductors from compression when the cable is tensioned. The invention has other advantages which will become apparent from the following disclosure.

The accompanying drawings illustrate specific examples of the invention, the various figures being as follows:

Figure 1, a perspective of a finished splice;

Figure 2, a longitudinal section of Figure 1; and

Figure 3, a perspective of a detail representing a modification.

More specifically, these drawings show a wire-armored cable splicing device comprising a tubular part 1 fitting over the spliced cable conductors 2 and having an exterior over which the oppositely extending armoring wires 3, at the splice, may be interlaid and clamped, as by means of seizings 4, the oppositely extending wires being cut off beyond the ends of the seizings and bent over, as at 5.

The exterior of the tubular part 1 has projections 6, which may be in the form of short longitudinal fins that are circumferentially spaced around this exterior to separate the interlaid armoring wires into circumferentially spaced groups. The tubular part 1 is radially rigid so it radially supports the interlaid armoring wires from compressing the spliced conductors 2 when the spliced cable is tensioned. The various armoring wires are easily interlaid in appropriately spaced groups through the convenience of the projections 6.

The opposite ends of the part 1 have axially aligned externally outwardly tapering sleeve parts 7 fitting over the conductors 2 adjacent their splicings, these sleeve parts rigidly extending from the tubular part 1 and externally having longitudinal fins 8 aligning with the projections, or fins, 6 for leading the armoring wires therebetween in similarly circumferentially separated groups. These sleeve parts provide for more conveniently arranging the armoring wires for interlaying on the part 1 and provide the device with the length required for structural stability. Preferably the inner ends of the outwardly tapering sleeve parts 7 have slightly greater diameters than the tubular part 1 so that the seizings 4, or other clamping means, deflect the armoring wires radially inwardly and further secure them against pulling apart due to tension. Preferably, the outermost ends of the sleeve parts 7 have necks 9 provided with projections, or short fins, 10 aligning with the fins 8 and the projections, or fins, 6, these necks being adapted to accommodate seizings 11 for effecting still further security. The openings 12 in the outer ends of the necks of the sleeve parts 7 are of smaller diameters than the passage through the device therebetween registering with the conductor splicings, whereby to provide greater freedom for these splicings while the ends more securely embrace the conductors. It is possible to pull the splicings through the end opening since the splicings can compress, but it is undesirable to maintain compression on the splicings continuously.

The device may be made as an integral casting which may be slid along the conductors when the armoring wires are laid back to bear the conductors, the device being slid over the conductor splicings, after they are made, and the armoring wires arranged as described. In the case of the modification, the device is made in the form of two castings as shown in Figure 3, thus separating the device centrally of its tubular part 1, and the projections 6 are in the form of apertured lugs for receiving fastenings joining the two castings into a rigid unit.

This invention provides for the combination of the oppositely extending electrical conductors 2, having their ends spliced together, with the radially rigid tubular part 1 fitted over the spliced conductor ends and the wire armoring 3, which is helically laid over the conductors, oppositely extending over the outside of the part 1 and interlaid on this outside, in conjunction with means for clamping the interlaid portions of the wires on this outside, as represented by the wire seizings 4. The tubular part 1 has the projections 6 spaced circumferentially therearound and separating the armoring wires into circumferentially spaced groups and the opposite ends of the part 1 have the axially aligned externally outwardly tapering sleeve parts 7 fitted over the conductors adjacent their spliced ends. These sleeve parts rigidly extend from the tubular part and externally have longitudinal fins 8 aligned with the projections 6, the armoring wires 3 extending to the tubular part over the outsides of these sleeve parts in the same groupings as between the projections 6. As described, the openings 12 in the outer ends of the sleeve parts, this being in the necks 9 that are parts of the sleeve parts, are of smaller diameters than the passage through the tubular part registering with the spliced ends of the conductors.

When the described splice is tensioned, by tensioning of the cable, the interlaid armoring wire portions are firmly locked together against the rigid support of the radially rigid part 1, this giving the splice great tensile strength and also relieving the conductors from any compression. The splice may be very easily assembled due to the convenience of the outwardly tapering sleeve parts 7 and the various projections and fins, all of which cooperate to permit a cable workman to make the splice conveniently, quickly and surely.

A further modification may comprise making the unit shown by Figure 1 in a longitudinally split form so there are two halves that are completely laterally separable. This has various advantages, such as permitting a repair in the armor where the cable core is undamaged or uncut and the armor wires only are damaged, since the two halves may be placed about the uncut core to provide for the repair of the armor. This modification is not illustrated since it would appear the same as Figure 1 excepting for the longitudinal split.

I claim:

1. A protector for splices in wire armored cable comprising a substantially rigid tube adapted to receive within its bore the inner plies of a cable, including the insulation at the region of a splice, the exterior of the tube having sets of radial fins adjacent the ends, sets of radial fins spaced inward from said first named fins and aligned therewith, and a set of radial fins centrally of the length of the tube spaced inward from said second named fins and aligned therewith, the fins thus providing longitudinal channels extending the length of the tube, the exterior surface of the tube being adapted to carry cable armor wires with wires from opposite cable sections overlapping and the fins retaining the wires in parallelism, the spaces between sets of fins being adapted to receive servings for securing the wires to the tube.

2. A protector for splices in wire armored cables comprising a substantially rigid tube adapted to receive within its bore the inner plies of a cable including the insulation, the tube bore being of enlarged diameter at the mid-portion to accommodate a cable splice and tapering toward the ends to provide a snug fit with cable insulation, the exterior of the tube having sets of radial fins adjacent the ends, sets of radial fins spaced inward from said first named fins and aligned therewith, and a set of radial fins centrally of the length of the tube spaced inward from said second named fins and aligned therewith, the fins thus providing longitudinal channels extending the length of the tube, the exterior surface of the tube being adapted to carry cable armor wires with wires from opposite cable sections overlapping and the fins retaining the wires in parallelism, the spaces between sets of fins being adapted to receive servings for securing the wires to the tube, the exterior diameter of the tube being less in the space between said first and second named fins than in the region of said first named fins, whereby tension may be applied to the wires by serving wrapped therearound in said space.

JAMES J. MORRISON.

REFERENCES CITED

The following references are of record in the file of this patent:

UNITED STATES PATENTS

| Number | Name | Date |
|---|---|---|
| 1,866,235 | Thiel | July 5, 1932 |
| 1,647,699 | Hoeftmann | Nov. 1, 1927 |
| 1,103,079 | Rhodes | July 14, 1914 |
| 472,933 | O'Connor | Apr. 12, 1892 |
| 1,073,596 | Egerton | Sept. 23, 1913 |

FOREIGN PATENTS

| Number | Country | Date |
|---|---|---|
| 391,826 | Germany | Mar. 19, 1924 |
| 229,506 | Great Britain | Feb. 26, 1925 |